UNITED STATES PATENT OFFICE.

JOSEPH GRIMMER AND FRITZ STRAUB, OF BASEL, SWITZERLAND, ASSIGNORS TO SOCIETY OF CHEMICAL INDUSTRY IN BASLE, OF BASEL, SWITZERLAND.

CHROMIUM COMPOUNDS OF AZO DYESTUFFS.

1,402,350.  Specification of Letters Patent.  Patented Jan. 3, 1922.

No Drawing.  Application filed April 15, 1921.  Serial No. 461,588.

*To all whom it may concern:*

Be it known that we, JOSEPH GRIMMER, a citizen of the Czecho-Slovak Republic, and resident of Basel, Switzerland, and FRITZ STRAUB, a citizen of the Swiss Republic, and resident of Basel, Switzerland, have invented new and useful Chromium Compounds of Azo Dyestuffs, of which the following is a full, clear, and exact specification.

We have found that new mordant dyeing dyestuffs are obtained by combinig the diazoderivative of a 1-amino-2-oxynaphtalene-4-sulfonic compound with a halogen substitution product of alphanaphthol. These dyestuffs dye wool in an acid bath red-violet tints, which by after-chroming become grey to blue and by after-coppering violet. By treating, these dyestuffs corresponding to the general formula R—N=N—R' (wherein R—N=N— designates a 1-diazo-2-oxynaphthalene-4-sulfonic compound and R' a halogenated alphanaphthol) further with agents yielding chromium, chromium compounds are obtained which are also new dyestuffs of valuable properties. These chromium compounds constitute dark powders, which dissolve in water with blue to greenish black colorations and in concentrated sulfuric acid with greenish blue to violet colorations and give on wool, when dyed according to the manner employed for acid dyestuffs, very fast, green-blue to grey tints.

The invention is illustrated by the following examples:

Example 1.

89 parts of 1-oxy-8-chloronaphthalene are dissolved in an excess of caustic soda lye and mixed at a low temperature with an aqueous suspension of 130 parts of diazotized 1-amino-2-oxy-naphthalene-4-sulfonic acid. The mixture is stirred until the diazo-compound has disappeared, diluted with water and neutralized with hydrochloric acid, whereupon the dyestuff is salted out.

The new dyestuff forms a dark powder having a weak metallic lustre. It produces red-violet tints on wool, which becomes greenish blue when after-chromed and blue violet when after-coppered.

428.5 parts of this dyestuff are introduced into 1000 parts of an aqueous solution containing 76.5 parts of chromium oxid, 224 parts of caustic soda and 112.5 parts of glycerine, and the whole is boiled for 10 hours in a reflux apparatus. The mixture is now diluted with three times its weight of water, the liberated alkali is neutralized with mineral acid and the chromiferous dyestuff is salted out, filtered and dried. It forms, when dry, a dark powder. It dyes wool in an acid bath very equal, green blue tints, fast to fulling and eminently fast to light.

Example 2.

213 parts of 1-oxy-5:8-dichloronaphtalene are dissolved in a mixture of 400 parts of water and 40 parts of caustic soda; the solution is mixed with a solution of 80 parts of caustic soda in 200 parts of water and into it is introduced an aqueous suspension of 305 parts of the nitro-compound of the diazotized 1-amino-2-oxy-naphthalene-4-sulfonic acid. The mixture is stirred, care being taken that the temperature does not rise above 10° C. As soon as the diazo-compound has disappeared, the mixture is diluted with much water and made feebly acid with hydrochloric acid; the dyestuff is then salted out, filtered and dried.

The new dyestuff is a dark red powder having a weak metallic lustre. It dyes wool in acid bath violet red, which becomes greenish grey on after-chroming and heliotrope on after-coppering.

530 parts of the sodium salt of this dyestuff are introduced into an aqueous solution of 312 parts of chronium fluoride containing chromium corresponding with 36.8 per cent of $Cr_2O_3$, in all 114.7 parts of $Cr_2O_3$, and 612 parts of crystallized sodium acetate; the mixture is boiled in a reflux apparatus for 7 hours, and is then filtered from any sediment which may be present. The filtrate is evaporated to half its volume, the chromium compound is precipitated by adding common salt and is filtered, pressed and dried. The dyestuff forms, when dry, a dark powder. It dyes wool in acid bath very equal grey tints, fast to fulling and eminently fast to light.

The following table shows the characteristic properties of some dyestuffs which can be made according the invention, the expression diazotized acid meaning diazotized 1-amino-2-oxy-naphthalene-4-sulfonic acid.

| Diazotized-component. | Coupling component. | Coloration of the solution in water. | Coloration of the solution in concentrated sulfuric acid. | Tint of the chromium compound on wool (acid dyes). |
|---|---|---|---|---|
| Diazotized acid | 1-Oxy-8-chloronaphthalene. | Blue | Blue | Green blue. |
| Chloro-diazotized acid | 1-Oxy-8-chloronaphthalene. | Blue | Blue | Green blue. |
| Bromo-diazotized acid | 1-Oxy-8-chloronaphthalene. | Blue | Greenish blue | Green blue. |
| Nitro-diazotized acid | 1-Oxy-8-chloronaphthalene. | Greenish black | Violet | Grey. |
| Diazotized acid | 1-Oxy-5: 8-dichloronaphthalene. | Blue | Blue | Green blue. |
| Chloro-diazotized acid | 1-Oxy-5: 8-dichloronaphthalene. | Blue | Greenish blue | Green blue. |
| Bromo-diazotized acid | 1-Oxy-5: 8-dichloronaphthalene. | Blue | Blue | Green blue. |
| Nitro-diazotized acid | 1-Oxy-5: 8-dichloronaphthalene. | Greenish black | Violet | Grey. |

What we claim is:

1. The herein described new chromium compounds resulting from the treatment of the new mordant dyeing dyestuff of the general formula R—N=N—R', (wherein R—N=N— signifies a 1-diazo-2-oxynaphthalene-4-sulfonic compound and R' a halogenated alphanaphthol) with an agent yielding chromium, which constitute dark powders soluble in water with blue to greenish-black and in concentrated sulfuric acid with greenish-blue to violet colorations and dye wool, when dyed according to the manner usually employed for acid dyestuffs, very equal and very fast blue to grey tints.

2. The herein described new chromium compounds resulting from the treatment of the new mordant dyeing dyestuffs of the general formula R—N=N—R', (wherein R—N=N— signifies a 1-diazo-2-oxynaphthalene-4-sulfonic compound and R' an alphachlorinated alphanaphthol) with an agent yielding chromium, which constitute dark powders soluble in water with blue to greenish-black and in concentrated sulfuric acid with greenish-blue to violet colorations and dye wool, when dyed according to the manner usually employed for acid dyestuffs, very equal and very fast blue to grey tints.

3. The herein described new chromium compounds resulting from the treatment of the new mordant dyeing dyestuffs of the general formula R—N=N—R', (wherein R—N=N— signifies a 1-diazo-2-oxynaphthalene-4-sulfonic compound and R' an alphadichlorinated alphanaphthol) with an agent yielding chromium, which constitute dark powders soluble in water with blue to greenish-black and in concentrated sulfuric acid with greenish-blue to violet colorations and dye wool, when dyed according to the manner usually employed for acid dyestuffs, very equal and very fast blue to grey tints.

4. The herein described new chromium compounds resulting from the treatment of the new mordant dyeing dyestuffs of the general formula R—N=N—R', (wherein R—N=N— signifies a 1-diazo-2-2oxynaphthalene-4-sulfonic compound and R' 5:8-dichloro-alpha-naphthol) with an agent yielding chromium, which constitute dark powders soluble in water with blue to greenish-black and in concentrated sulfuric acid with greenish-blue to violet colorations and dye wool, when dyed according to the manner usually employed for acid dyestuffs, very equal and very fast blue to grey tints.

5. The herein described new chromium compounds resulting from the treatment of the new mordant dyeing dyestuffs of the general formula R—N=N—R', (wherein R—N=N— signifies a nitro-1-diazo-2-oxynaphthalene-4-sulfonic acid and R' 5:8-dichoroalpha-naphthol) with an agent yielding chromium, which constitute dark powders soluble in water with greenish-black coloration and in concentrated sulfuric acid with violet coloration and dye wool, when dyed according to the manner usually employed for acid dyestuffs, very equal and very fast grey tints.

In witness whereof we have hereunto signed our names this 1st day of April, 1921, in the presence of two subscribing witnesses.

JOSEPH GRIMMER.
FRITZ STRAUB.

Witnesses:
FRIDA KURZ,
AMAND RITTER.